United States Patent
Cazier et al.

(10) Patent No.: US 7,889,242 B2
(45) Date of Patent: Feb. 15, 2011

(54) BLEMISH REPAIR TOOL FOR DIGITAL PHOTOGRAPHS IN A CAMERA

(75) Inventors: Robert P. Cazier, Ft. Collins, CO (US); Douglas Kirkland, Los Angeles, CA (US); Murray Dean Craig, Johnstown, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 498 days.

(21) Appl. No.: 11/553,278

(22) Filed: Oct. 26, 2006

(65) Prior Publication Data

US 2008/0100726 A1 May 1, 2008

(51) Int. Cl.
*H04N 1/00* (2006.01)

(52) U.S. Cl. .................... 348/222.1; 348/246; 382/165; 382/254; 382/275

(58) Field of Classification Search ............. None
See application file for complete search history.

(56) References Cited

U.S. PATENT DOCUMENTS

| | | | | |
|---|---|---|---|---|
| 5,130,789 A | * | 7/1992 | Dobbs et al. ............. | 358/500 |
| 5,555,194 A | * | 9/1996 | Cok ........................ | 382/254 |
| 6,895,112 B2 | | 5/2005 | Chen et al. | |
| 6,980,691 B2 | * | 12/2005 | Nesterov et al. ......... | 382/165 |
| 7,034,881 B1 | | 4/2006 | Hyodo et al. | |
| 7,277,595 B1 | * | 10/2007 | Reid ........................ | 382/275 |
| 2001/0041018 A1 | * | 11/2001 | Sonoda ................... | 382/275 |
| 2002/0081003 A1 | * | 6/2002 | Sobol ..................... | 382/118 |
| 2004/0032512 A1 | | 2/2004 | Silverbrook | |
| 2004/0041924 A1 | * | 3/2004 | White et al. ............. | 348/239 |
| 2004/0130631 A1 | * | 7/2004 | Suh ....................... | 348/222.1 |
| 2004/0170337 A1 | * | 9/2004 | Simon et al. ............ | 382/254 |
| 2004/0196292 A1 | | 10/2004 | Okamura | |
| 2005/0244053 A1 | * | 11/2005 | Hayaishi ................. | 382/164 |
| 2006/0017826 A1 | * | 1/2006 | Sekimoto et al. ....... | 348/246 |
| 2006/0140500 A1 | * | 6/2006 | Ozaki .................... | 382/254 |

\* cited by examiner

*Primary Examiner*—David L Ometz
*Assistant Examiner*—Dwight Alex C Tejano

(57) ABSTRACT

Systems and methods for implementing a blemish repair tool for digital photographs in a camera are disclosed. An exemplary method of repairing a blemish in a digital image on a camera may comprise selecting at least one candidate region including a blemish in the digital image. The method may also comprise cloning pixel values for repairing the blemish. The method may also comprise overlaying the cloned pixel values on the candidate region of the digital image.

20 Claims, 5 Drawing Sheets

BLEMISH REPAIR TOOL FOR DIGITAL PHOTOGRAPHS IN A CAMERA

BACKGROUND

Conventional film and more recently, digital cameras, are widely commercially available, ranging both in price and in operation from sophisticated single lens reflex (SLR) cameras used by professional photographers to inexpensive "point-and-shoot" cameras that nearly anyone can use with relative ease. Little, if anything, is commercially available for "touching up" photographs on the camera.

Although digital cameras are available with user interfaces that enable a user to select various camera features for editing their photographs, these features are typically limited in nature (e.g. red-eye removal). The camera user may attempt to hide blemishes in the image by moving the camera ever so slightly during photo capture to blur the image just enough so that the blemish is not as readily visible. However, the quality of the entire image may suffer, particularly if the camera user is not experienced with such techniques. Advanced touch-up of the photo typically needs to be done on a personal computer using sophisticated software that not all camera users have access to, feel comfortable using, or the desire and time to spend using.

DETAILED DESCRIPTION

Systems and methods are disclosed for repairing one or more blemish in digital photographs. Exemplary systems may be implemented as an easy-to-use interface displayed on the digital camera and navigated by the user with conventional camera controls (e.g., arrow buttons and zoom levers already provided on the camera). The user needs little, if any, knowledge about photo-editing, and does not need special software for their PC to repair blemishes in digital photographs on their camera.

Various user options for repairing the blemish are also available and can be readily selected by the user from a plurality of predetermined settings directly on the camera itself. Optionally, the user may also select multiple blemishes and apply the repair simultaneously without having to repeat the process for each blemish, thereby saving limited memory and processing resources on the camera.

Exemplary Systems

Figure 1:
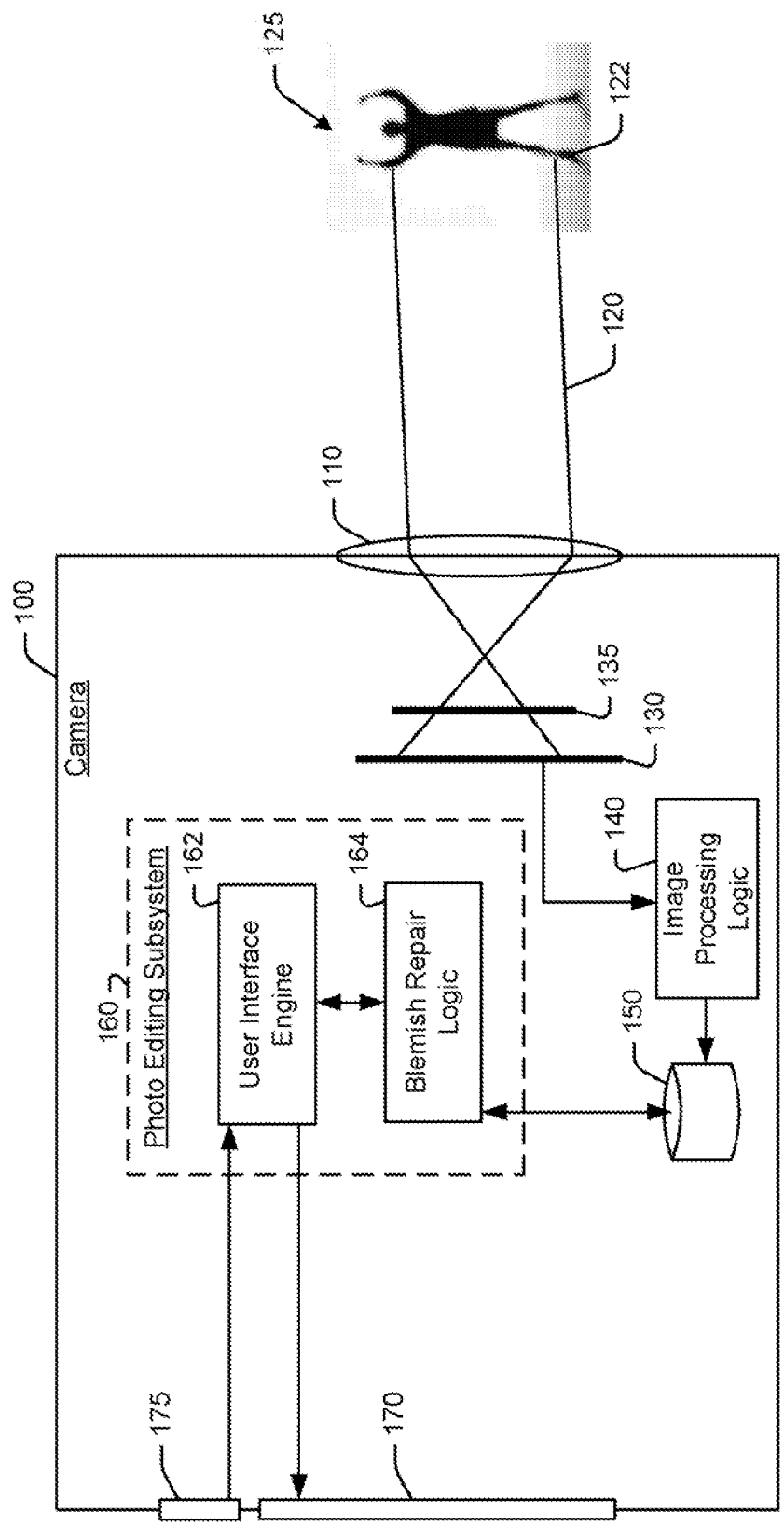
FIG. 1 is a block diagram of an exemplary camera system which may implement a blemish repair tool for digital photographs.

FIG. 1 is a block diagram of an exemplary camera system which may implement a blemish repair tool for digital photographs. The exemplary camera system 100 may be a digital camera including a lens 110 positioned to focus light 120 reflected from one or more objects 122 in a scene 125 onto an image capture device or image sensor 130 when a shutter 135 is open (e.g., for image exposure). Exemplary lens 110 may be any suitable lens which focuses light 120 reflected from the scene 125 onto image sensor 130.

Exemplary image sensor 130 may be implemented as a plurality of photosensitive cells, each of which builds-up or accumulates an electrical charge in response to exposure to light. The accumulated electrical charge for any given pixel is proportional to the intensity and duration of the light exposure. Exemplary image sensor 130 may include, but is not limited to, a charge-coupled device (CCD), or a complementary metal oxide semiconductor (CMOS) sensor.

Camera system 100 may also include image processing logic 140. In digital cameras, the image processing logic 140 receives electrical signals from the image sensor 130 representative of the light 120 captured by the image sensor 130 during exposure to generate a digital image of the scene 125. The digital image may be stored in the camera's memory 150 (e.g., a removable memory card).

Shutters, image sensors, memory, and image processing logic, such as those illustrated in FIG. 1, are well-understood in the camera and photography arts. These components may be readily provided for digital camera 100 by those having ordinary skill in the art after becoming familiar with the teachings herein, and therefore further description is not necessary.

Digital camera 100 may also include a photo-editing subsystem 160. In an exemplary embodiment, photo-editing subsystem 160 is implemented in program code (e.g., firmware and/or software) residing in memory on the digital camera 100 and executable by a processor in the digital camera 100, such as the memory and processor typically provided with commercially available digital cameras. The photo-editing subsystem 160 may include a user interface engine 162 and blemish repair logic 164.

The blemish repair logic 164 may be operatively associated with the memory 150 for accessing digital images (e.g., reading the images stored in memory 150 by image processing logic 140 or writing the images generated by the blemish repair logic 164). Blemish repair logic 164 may include program code for repairing one or more blemish in the digital images stored on the camera system 100, as explained in more detail below. The blemish repair logic 164 may also be operatively associated with the user interface engine 162.

User interface engine 162 may be operatively associated with a display 170 and one or more camera controls 175 already provided on may commercially available digital cameras. Such an embodiment reduces manufacturing costs (e.g., by not having to provide additional hardware for implementing the photo-editing subsystem 160), and enhances usability by not overwhelming the user with additional camera buttons.

During operation, the user interface engine 162 displays a menu on the digital camera (e.g., on display 170) for selecting the blemish repair tool. In an exemplary embodiment, the blemish repair tool may be accessed by a user selecting the "Design Gallery" menu option. The menu for the blemish repair tool may then be navigated by a user making selections from any of a variety of menus options for repairing a blemish. For example, the user interface engine 162 may receive input (e.g., via one or more of the camera controls 175) identifying user selection(s) for repairing a blemish. The blemish repair logic 164 may then be implemented to repair a blemish in a digital image stored in the digital camera 100 (e.g., in memory 150) based on user selection(s) from the effects menu, as described in more detail below with reference to FIGS. 2-4.

A preview image may be displayed on display 170 so that the user can see the digital image after the blemish has been repaired. Optionally, instructive text may also be displayed on display 170 for modifying, or accepting/rejecting the blemish repair. The instructive text may be displayed until the user operates a camera control 175 (e.g., presses a button on the digital camera 100). After the user operates a camera control 175, the text may be removed so that the user can better see the preview image with the repaired blemish on display 170.

Also optionally, the user may operate camera controls 175 (e.g., as indicated by the instructive text) to modify the blemish repair. For example, the user may press the left/right arrow buttons on the digital camera 100 to increase or decrease the degree of blur used to repair the blemish (e.g., softening the effect so that it is not so readily apparent upon visual inspection).

In an exemplary embodiment, a copy of the original digital photograph is used for repairing the blemish. For example, the new image may be viewed by the user on display 170 directly after the original image so that the user can readily see both the original image and the modified image.

Before continuing, it is noted that the digital camera shown and described above with reference to FIG. 1 is merely exemplary of a camera system which may implement a blemish repair tool for digital photographs. The systems and methods described herein, however, are not intended to be limited only to use with the camera system 100. Other embodiments of camera systems which may implement a blemish repair tool for digital photographs are also contemplated.

Figure 2A:
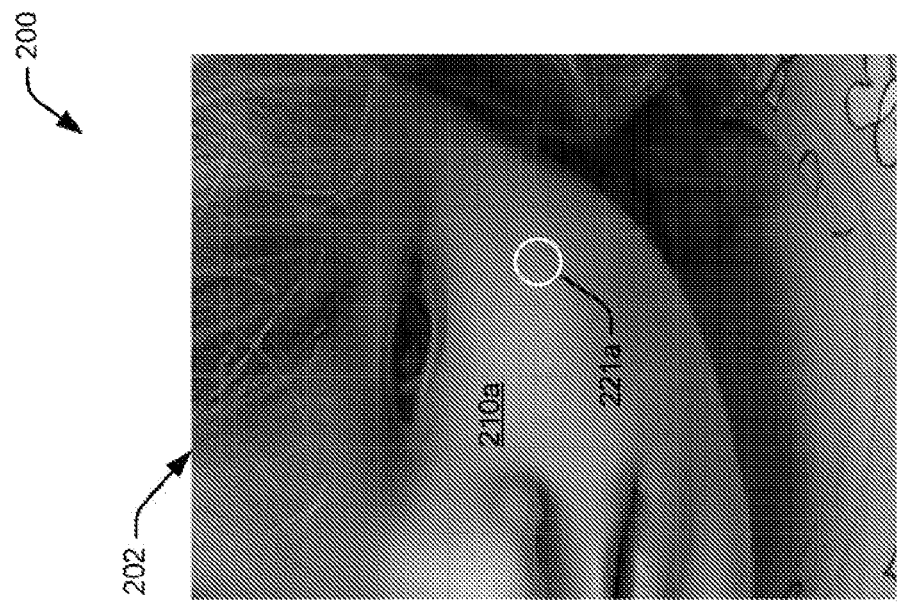
FIGS. 2a-b show exemplary digital photographs that illustrate blemish repair.
Figure 2A:
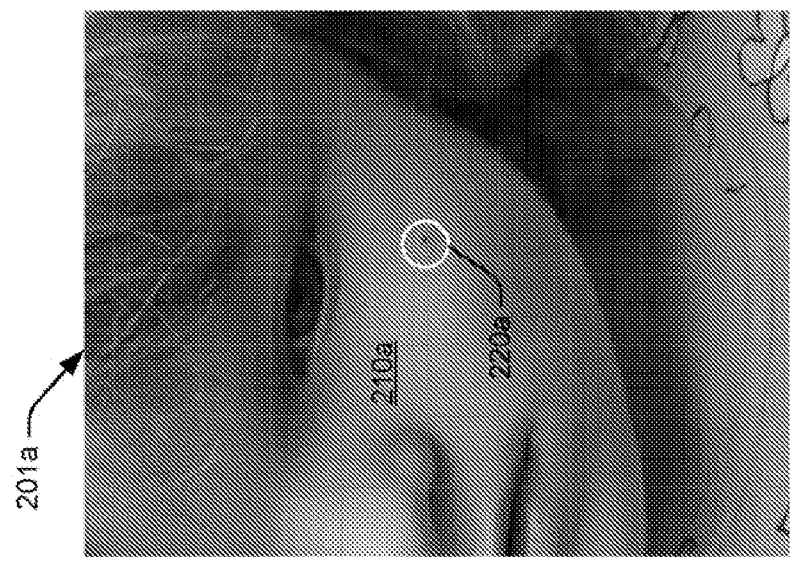
Figure 2B:
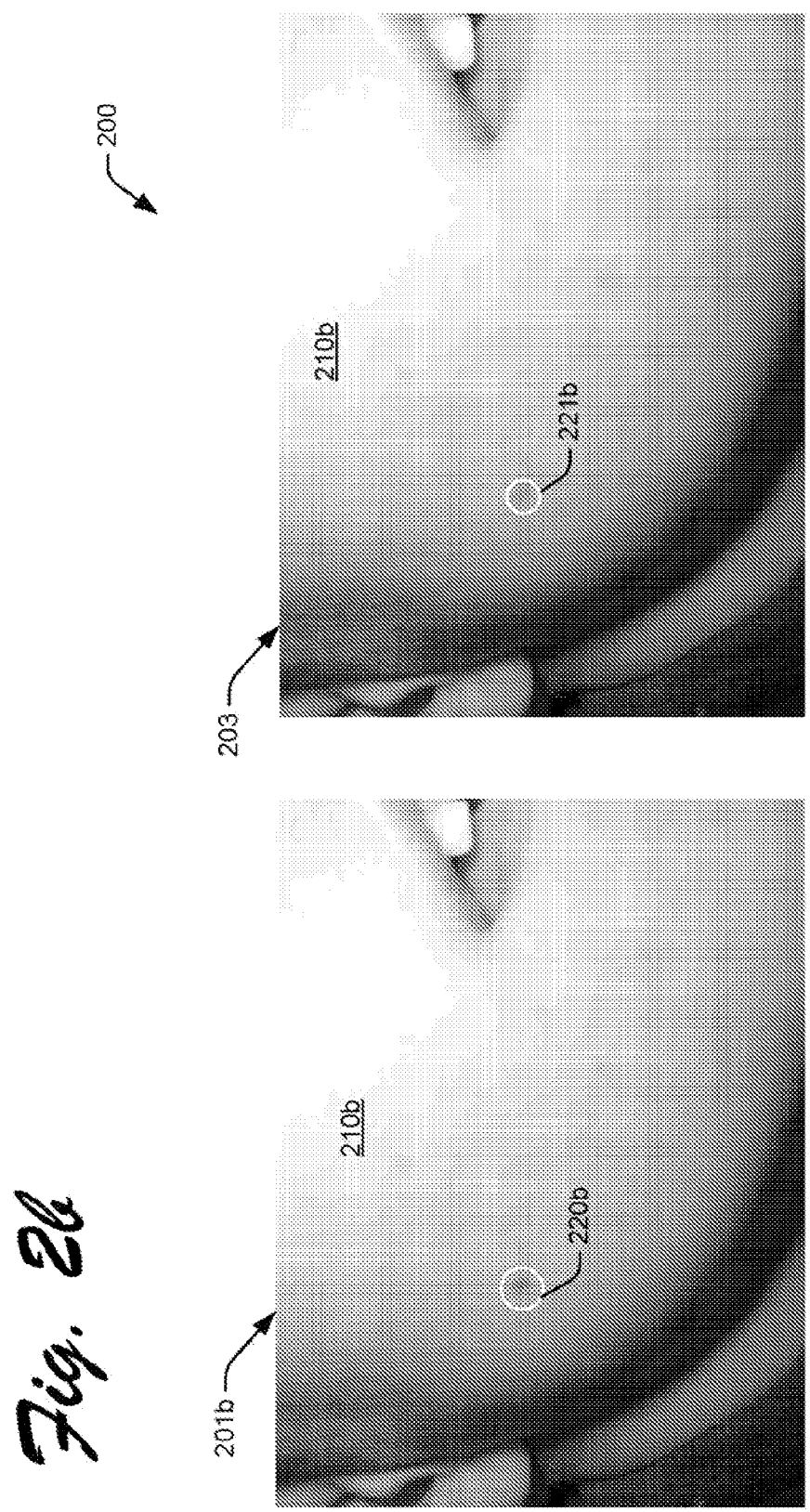

FIGS. 2a-b show exemplary digital photographs 200 that illustrate blemish repair, such as may be generated by the camera system 100 in FIG. 1. In both FIGS. 2a and 2b, an original digital photograph 201a-b is shown on the left-hand side of the drawing with the subject 210a-b appearing as originally captured by the camera. The subject 210a-b of the photograph (and/or camera user) may believe one or more blemish (e.g., a wrinkle, mole, pimple, etc.) is exaggerated in the original digital photograph 201a-b. For example, the subject 210a-b may believe that the pimple in circle 220a (FIG. 2a) and/or the mole in circle 220b (FIG. 2b) are exaggerated in the digital photograph 201a-b, respectively.

Accordingly, the camera user may use the blemish repair tool in the camera to "repair" one or more blemish in the original digital photograph 201a-b so that the blemish appears less pronounced. Image 202 in FIG. 2a, and image 203 in FIG. 2b, both illustrate application of the blemish repair tool to the original digital photographs 201a-b to repair the blemishes 220a-b, respectively.

It is readily observed by comparing the images 202 and 203 to the original digital photographs 201a-b, respectively, that the repaired blemishes 221a-b appear less pronounced after using the blemish repair tool. In addition, it is not necessary to blur the entire image to repair the blemishes 220a-b. Accordingly, the images 202 and 203 remain well-focused and do not appear to be altered.

Although FIGS. 2a-b show separate images 202 and 203 for correcting each type of blemish 220a-b, the blemish repair tool is not limited to use in just one area of the original digital photographs 201a-b. In exemplary embodiments, more than one blemish may be selected from the same photograph and repaired simultaneously so that all of the selected blemishes appear less pronounced in the repaired image. Such an embodiment may reduce processing and memory requirements to implement the blemish repair tool in a camera (i.e., only one repaired image needs to be generated to repair a plurality of blemishes).

Exemplary embodiments for repairing the blemishes 220a-b can be better understood with reference to the simplified illustrations described below with reference to FIG. 3.

Figure 3:
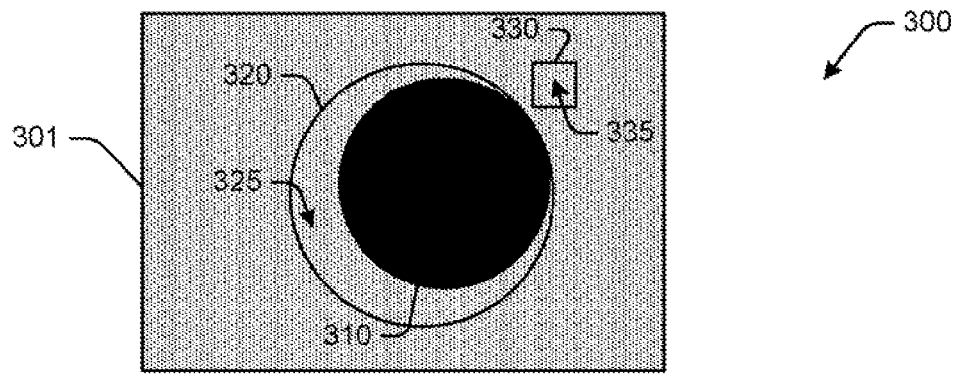
FIG. 3 are illustrations showing exemplary blemish repair for digital photographs.
Figure 3:
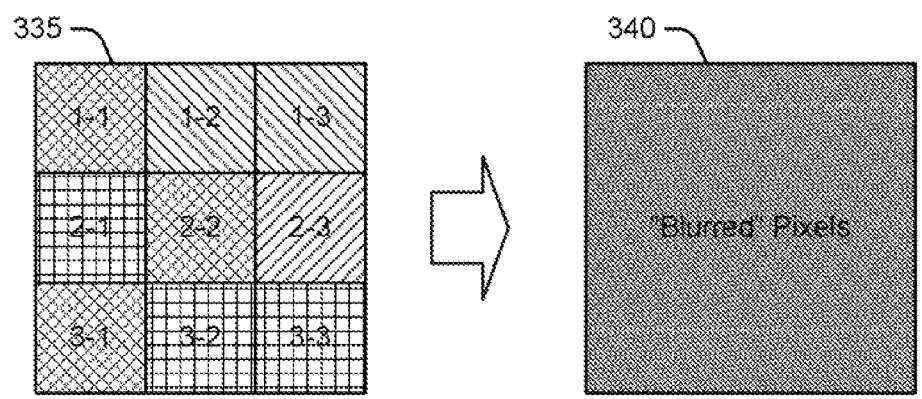
Figure 3:
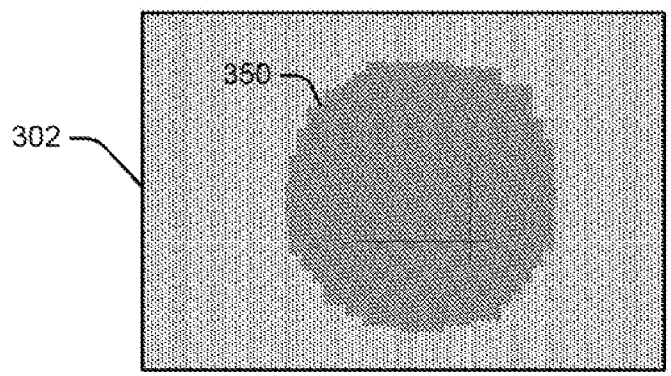

FIG. 3 are illustrations 300 showing exemplary blemish repair for digital photographs in a camera (e.g., the images 200 in FIG. 2 using the camera system 100 in FIG. 1). In FIG. 3, image 301 represents the original digital photograph, and the circle 310 represents the blemish (e.g., the pimple 220a in FIG. 2a, or the mole 220b in FIG. 2b).

A cursor 320 may be displayed for the user to move around on the camera display and select a candidate region 325 including at least one blemish 310 in the image 301. In an exemplary embodiment, the user may press the 4-way rocker switch on the camera to move the cursor 320 to the candidate region 325. The camera's zoom lever may also be used to control the radius of the cursor 320 so that the candidate region 325 includes substantially only the blemish 310. To facilitate the movement around the image 301, the "jump distance" of the cursor 320 may be accelerated in proportion to the amount of time the 4-way rocker switch is depressed. Alternatively the cursor 320 may be incremented in its location, e.g., by one radius of the circle size. In either case any portion of the image 301 may be interactively selected by the user.

In an exemplary embodiment, the image 301 (or a portion of the image) may be magnified so that the user can more readily select substantially only the blemish 310. For example, the image 301 may be magnified if there is a limited display area on the camera. The cursor 320 can then be "driven" around the image 301 with only small portions being visible within the cursor 320 (or in the overall display).

Optionally, candidate regions 325 may be automatically selected by the camera. In an exemplary embodiment, image recognition algorithms may be implemented to identify potential blemishes in the image 301. The automatic selections may be displayed for the user and the user may then select which of the potential blemishes to repair and which should be left alone.

After the candidate region(s) 325 are selected, pixels may be cloned for repairing the blemish. In an exemplary embodiment, pixels are sampled from another portion of the image for cloning. Although pixels may be sampled from any portion of the image, pixels sampled adjacent the blemish 320 have a greater likelihood of blending with the surroundings after the repair operation. In FIG. 3, the sampled pixels 335 are shown in square 330. It is also noted that pixels may be sampled from more than one portion of the image 301.

The sampled pixels 335 may be applied to the blemish 310 using any of a wide variety of algorithms. A simple algorithm may include overlaying or covering the blemish 310 with the sampled pixels 335, e.g., by feathering the sample pixels 335 in a circular fashion over the candidate region 325. More sophisticated algorithms may also be implemented.

For purposes of illustration, a Gaussian blur kernel may be implemented for better results in the rendered image. In an exemplary embodiment, the Red-Green-Blue (RGB) pixel values for each pixel in the sample 335 may be averaged as triplets (e.g., 3 rows of pixel values and 3 columns of pixel values) to generate a "blurred" sample 340. The averaging function may be weighted such that pixel values toward the center of the sample 330 may be given more weight than the pixel values on the edges. For purposes of illustration.

$$R-AVG = \frac{2 \times (R1-1) + 3 \times (R1-2) + 2 \times (R1-3)}{3}$$

where:

R1-1 is the red pixel value for row 1, column 1 of the sample, and is weighted by a factor of 2;

R1-2 is the red pixel value for row 1, column 2 of the sample, and is weighted by a factor of 5;

R1-3 is the red pixel value for row 1, column 3 of the sample, and is weighted by a factor of 2; and R-AVG is the weighted-average red pixel value of the RGB triplet.

Before continuing, it is noted that the blemish repair algorithm is not limited to use with RGB pixel values. For example, the Gaussian blur kernel may be implemented with YCbCr pixel values. In YCbCr, the Y value represents pixel brightness or luma, vector Cb represents blue minus the brightness (B-Y), and Cr represents red minus the brightness (R-Y).

In an exemplary embodiment, the luminance channel (Y) may be cloned (e.g., by determining an average, weighted average, brightest, darkest, etc. value of the luminance channel). For example, the lightest luminance channel may be averaged wit hall of the other Y values in the pixel sample 335. In other words each Y channel value is averaged or "blurred" with the lightest Y channel to "fade" the blemish.

The blurred sample 340 may then be applied to the blemish 310, e.g., by overlaying (or overwriting) pixel values in the original image 301 corresponding to the blemish 310, as shown by the "blurred" effect or blemish repair 350 in image 302. In an exemplary embodiment, the blemish repair may be previewed for the user, e.g., by displaying the entire image, or a portion of the image with the blemish repair on the camera display. It is readily observed by comparing the original image 301 to the repaired image 302 that the blemish 310 is less pronounced in the repaired image 302. In addition, substantially only the candidate region 325 in the image 301 has been altered so that the image 302 remains crisp and does not appear to be altered. If the user accepts the changes (e.g., by selecting "ok" on the camera interface), the blemish repair 350 is applied to the image 302.

Optionally, the user may select from options displayed on the camera's interface to "soften" the blemish repair 350. The options may correspond to different weighting factors to use for the averaging function, thereby producing different blurred samples 340. For example, and Option 1 may correspond to a predetermined weighting factor of 1-3-1, and Option 2 may correspond to a predetermined weighting factor of 2-5-2. and an Option 3 may correspond to a predetermined weighting factor of 3-7-3. The user can then select which of the blemish repairs 350 looks best. Although the user's selection may depend at least to some extend on the user's preferences, typically the user will want to select the blemish repair 350 that makes the blemish appear less pronounced without making it apparent (or overly apparent) to a viewer that the digital photograph has been altered.

It is noted that predetermined weighting simplifies the user interface and also reduces processing requirements and time to repair the blemish. Accordingly, the blemish repair can be readily implemented on an embedded system, such as the camera system 100 described above with reference to FIG. 1. Of course other options may also be provided to the user. For example, a slider (e.g., the camera's zoom lever) or other user input may allow the user to select finer gradations for softening the blemish repair.

Optionally, the original pixel values (along with coordinates of the pixels in the original image) may be stored, e.g., as meta data in the image file header. This allows for a quick undo if the user wants to revert to the original image, even after the image has been offloaded from the camera (e.g., onto a personal computer or other storage device).

Before continuing, it is noted that the algorithms are not limited to Gaussian blur kernels. Any of a wide variety of different algorithms may be implemented for cloning pixels. Other embodiments may include, but are not limited to, median filters, skin analysis, histogram analysis and lookup table systems. These and other algorithms now known or later developed may be implemented, as will be readily apparent to one having ordinary skill in the art after becoming familiar with the teachings herein. In exemplary embodiments where the cloning operations are begin implemented on a digital camera, selection of these algorithms may depend at least to some extent on the processing and memory constraints of the camera system.

Exemplary Operations

Exemplary operations may be embodied as logic instructions on one or more computer-readable medium. When executed on a processor (e.g., in the camera), the logic instructions implement the described operations. In an exemplary embodiment, the components and connections depicted in the figures may be implemented.

Figure 4:
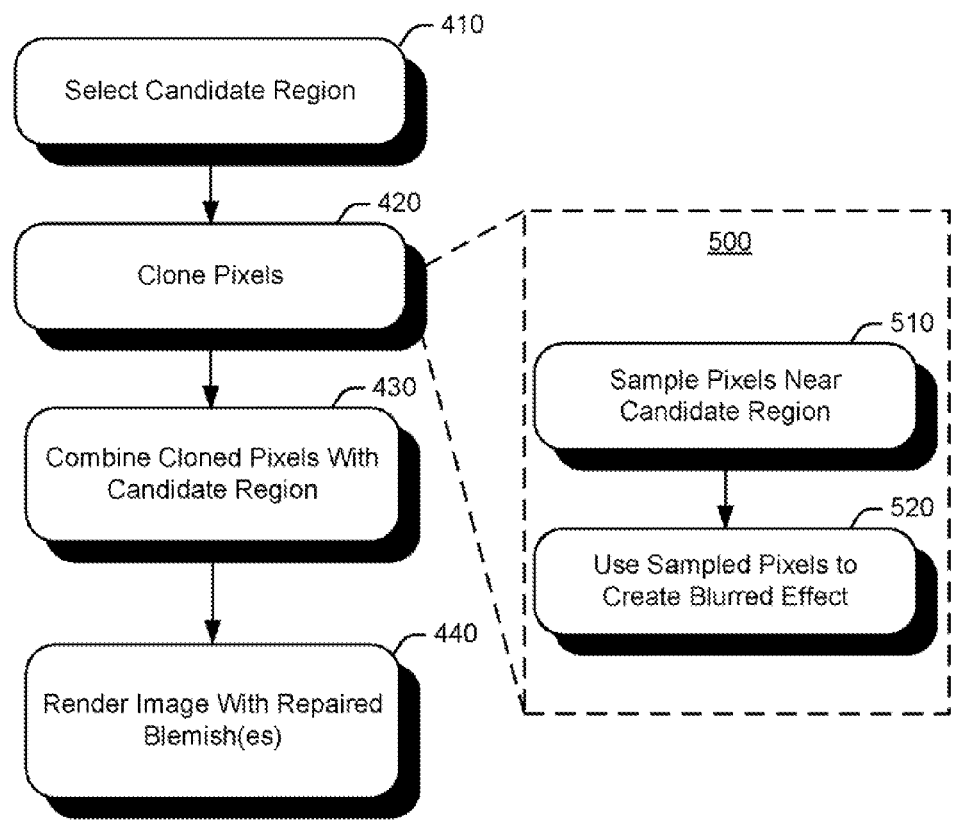
FIG. 4 is a flowchart illustrating exemplary operations to implement a blemish repair tool for digital photographs in a camera.

FIG. 4 is a flowchart illustrating exemplary operations 400 to implement a blemish repair tool for digital photographs. In operation 410, at least one candidate region in a digital photograph may be selected. The candidate region(s) may include one or more blemishes to repair. For example, the candidate region(s) may be selected interactively based at least in part on user input received via a user interface on the camera. In another example, the candidate region(s) may be selected automatically by the camera using image-recognition. Optionally, the candidate region(s) may be selected automatically by the camera and then displayed for the user to accept or reject before repairing (e.g., some imperfections are seen as a key characteristic of a person and/or the photograph).

In operation 420, pixels may be cloned. An exemplary embodiment for cloning the pixels is shown in FIG. 4 with reference to operations 500. In operation 510, pixels near or adjacent a candidate region are sample. In operation 520, the sampled pixel values are used to create a blurred effect. It is noted, however, that operations 500 are merely exemplary and operation 420 is not limited to implementation by operations 500.

In operation 430, the cloned pixel may be combined with the candidate region. For example, the pixels representing the blemish may be replaced with the cloned pixels. Accordingly, the cloned pixels serve to hide or cover the blemish. In operation 440, an image with the repaired blemishes may be rendered. For example, the rendered image may be displayed on the camera display for the user to accept/reject and/or further modify.

It is noted that the exemplary embodiments shown and described are provided for purposes of illustration and are not intended to be limiting. Still other embodiments for implementing a blemish repair tool for digital photographs are also contemplated.

The invention claimed is:

1. A digital camera system comprising:
   non-transitory computer-readable storage for storing an original digital image in the digital camera;
   blemish repair logic executing in the digital camera to repair at least one blemish in the original digital image, the blemish repair logic:
   sampling pixel values adjacent the blemish and excluding pixel values of the blemish to generate a sample using an averaging function, the averaging function weighted with pixel values toward the center of the sample given more weight than pixel values toward the edges of the sample, wherein the blemish repair logic weights the sample by combining an averaging of each Y channel value with a Y-lightest pixel value;

cloning pixel values using the sampled pixel values for repairing the blemish;

overlaying the cloned pixel values on the blemish in the original digital image; and rendering the repaired image.

2. The digital camera system of claim 1, wherein the blemish repair logic combines only adjacent pixel values to create cloned pixel values having a blurred effect.

3. The digital camera system of claim 2, wherein the blemish repair logic combines the pixel values by weighted averaging of RGB triplets.

4. The digital camera system of claim 2, wherein the blemish repair logic combines the pixel values by weighted averaging of YCbCr pixel values.

5. The digital camera system of claim 1, further comprising user interface logic executing to interactively select a plurality of blemishes in the original digital image.

6. A method of repairing a blemish in a digital image on a camera, the method implemented by computer program code stored on a non-transitory computer-readable medium and executable by a processor to perform the operations comprising:

selecting at least one candidate region including a blemish in the digital image;

cloning pixel values for repairing the blemish by sampling pixel values adjacent the blemish while excluding pixel values of the blemish in the sampling and applying an averaging function to the sampling, the averaging function weighted with pixel values toward the center of the sampling given more weight than pixel values toward the edges of the sampling, wherein weighting the sampling is by combining an averaging of each Y channel value with a Y-lightest pixel value; and overlaying the cloned pixel values on the candidate region of the digital image.

7. The method of claim 6, wherein cloning pixel values further includes combining the sampled pixel values to create a blurred effect.

8. The method of claim 7, wherein combining the sampled pixel values is by weighted averaging of RUB triplets.

9. The method of claim 7, wherein combining the sampled pixel values is by weighted averaging of YCbCr pixel values.

10. The method of claim 6, further comprising selecting a plurality of candidate regions and rendering the digital image only after repairing the blemish in each candidate region.

11. The method of claim 6, further comprising magnifying at least a portion of the digital image before selecting at least one candidate region.

12. The method of claim 6, wherein selecting the at least one candidate region is automatic by the camera.

13. The method of claim 6, wherein selecting the at least one candidate region is interactive with a user of the camera.

14. The method of claim 6, further comprising storing original pixel values for the candidate region in a header of the digital image for undo-operations even after the digital image is offloaded from the camera.

15. A non-transitory computer-readable medium encoded with a computer program for repairing a blemish in a digital image, the computer process comprising executable program code for:

identifying at least one candidate region in the digital image including the blemish;

sampling pixel values adjacent the blemish and excluding pixel values for the blemish and applying averaging function, the averaging function weighted with pixel values toward the center of the sampled pixel values given more weight than pixel values toward the edges of the sampled pixel values, wherein weighting the sampled pixel values is by combining an averaging of each Y channel value with a Y-lightest pixel value;

cloning pixel values using the sampled pixel values for repairing the blemish;

overlaying the cloned pixel values on the candidate region of the digital image; and rendering a repaired image.

16. The computer-readable medium encoded with a computer program of claim 15, further comprising executable program code for combining the sampled pixel values to create a blurred effect.

17. The computer-readable medium encoded with a computer program of claim 15, further comprising executable program code for averaging RGB triplets.

18. The digital camera system of claim 1, wherein a weighting factor for the averaging function is a user-selected option.

19. The digital camera system of claim 18, wherein the weighting factor for the averaging function is user-selected from preconfigured weighting factors already provided in the digital camera system.

20. The digital camera system of claim 1, wherein the averaging function is defined at least in part by the following equation:

$$R-AVG = \frac{X \times (R1-1) + Y \times (R1-2) + Z \times (R1-3)}{3}$$

where:

R1-1 is a red pixel value for row 1, column 1 of the sample, and is weighted by a factor of X;

R1-2 is a red pixel value for row 1, column 2 of the sample, and is weighted by a factor of Y;

R1-3 is a red pixel value for row 1, column 3 of the sample, and is weighted by a factor of Z; and R-AVG is a weighted-average red pixel value of an RGB triplet.

* * * * *

UNITED STATES PATENT AND TRADEMARK OFFICE
CERTIFICATE OF CORRECTION

PATENT NO. : 7,889,242 B2 Page 1 of 1
APPLICATION NO. : 11/553278
DATED : February 15, 2011
INVENTOR(S) : Robert P. Cazier et al.

It is certified that error appears in the above-identified patent and that said Letters Patent is hereby corrected as shown below:

In column 7, line 44, in Claim 8, delete "RUB" and insert -- RGB --, therefor,

Signed and Sealed this
Twenty-fourth Day of May, 2011

David J. Kappos
*Director of the United States Patent and Trademark Office*